US008752352B2

(12) United States Patent
Schulte

(10) Patent No.: US 8,752,352 B2
(45) Date of Patent: Jun. 17, 2014

(54) COVERING FROM MECHANICALLY INTERCONNECTABLE ELEMENTS

(76) Inventor: Guido Schulte, Rüthen-Meiste (DE)

(*) Notice: Subject to any disclaimer, the term of this patent is extended or adjusted under 35 U.S.C. 154(b) by 0 days.

(21) Appl. No.: 13/499,804

(22) PCT Filed: Sep. 15, 2010

(86) PCT No.: PCT/DE2010/001089
§ 371 (c)(1),
(2), (4) Date: Apr. 2, 2012

(87) PCT Pub. No.: WO2011/038709
PCT Pub. Date: Apr. 7, 2011

(65) Prior Publication Data
US 2012/0192521 A1   Aug. 2, 2012

(30) Foreign Application Priority Data
Oct. 2, 2009   (DE) .................. 10 2009 048 050

(51) Int. Cl.
E04B 2/00   (2006.01)

(52) U.S. Cl.
USPC ............................. 52/588.1; 52/589.1

(58) Field of Classification Search
USPC ............ 52/588.1, 582.1, 591.1, 591.4, 591.5, 52/592.1, 589.1; 403/320, 409.1
See application file for complete search history.

(56) References Cited

U.S. PATENT DOCUMENTS

| 7,726,088 | B2* | 6/2010 | Muehlebach | 52/582.1 |
| 7,980,039 | B2 | 7/2011 | Groeke et al. | |
| 8,220,217 | B2* | 7/2012 | Muehlebach | 52/582.1 |
| 8,302,361 | B2* | 11/2012 | Braun et al. | 52/588.1 |
| 8,375,674 | B2* | 2/2013 | Braun et al. | 52/592.1 |
| 8,631,621 | B2 | 1/2014 | Hannig | |
| 2007/0006543 | A1* | 1/2007 | Engstrom | 52/582.1 |
| 2009/0064624 | A1* | 3/2009 | Sokol | 52/589.1 |
| 2009/0100782 | A1* | 4/2009 | Groeke et al. | 52/589.1 |
| 2010/0281803 | A1* | 11/2010 | Cappelle | 52/309.1 |
| 2010/0300029 | A1* | 12/2010 | Braun et al. | 52/588.1 |
| 2011/0094083 | A1 | 4/2011 | Schulte | |
| 2012/0096801 | A1* | 4/2012 | Cappelle | 52/592.1 |

FOREIGN PATENT DOCUMENTS

| DE | 102004001363 | 8/2005 |
| DE | 20 2007 017 602 U1 | 4/2008 |
| DE | 20 2007 018 662 U1 | 2/2009 |
| EP | 1 350 904 A2 | 10/2003 |
| EP | 2 034 106 A1 | 3/2009 |

(Continued)

Primary Examiner — Brian Glessner
Assistant Examiner — Paola Agudelo
(74) Attorney, Agent, or Firm — Henry M Feiereisen LLC

(57) ABSTRACT

A covering from mechanically interconnectable elements, wherein at least one of the elements is a panel, wherein the elements have on their confronting sides a complementary profiling and can be locked together via said profiling. The locking is caused by at least one tongue element which is connected to one of the elements in an articulated manner and which can be pivoted during the joining motion behind a locking edge of the adjacent element, said locking edge extending essentially in the horizontal direction. The tongue element is in part connected to a core of the element by means of an elastic material and is a one-piece component of the element prior to the joining motion, wherein the one-piece connection between the tongue element and the element is configured as a predetermined breaking site which is provided to fail, in particular break, when the tongue element is pivoted.

18 Claims, 4 Drawing Sheets

(56) References Cited

FOREIGN PATENT DOCUMENTS

| RU | 2 265 703 | 12/2005 |
|----|-----------|---------|
| WO | WO 2004/003314 A1 | 1/2004 |
| WO | WO 2009/066153 A2 | 5/2009 |
| WO | WO 2010/142671 A1 | 12/2010 |

* cited by examiner

COVERING FROM MECHANICALLY INTERCONNECTABLE ELEMENTS

CROSS-REFERENCES TO RELATED APPLICATIONS

This application is the U.S. National Stage of International Application No. PCT/DE2010/001089, filed Sep. 15, 2010, which designated the United States and has been published as international Publication No. WO 2011/038709 A1 and which claims the priority of German Patent Application, Serial No. 10 2009 048 850.1, filed Oct. 2, 2009, pursuant to 35 U.S.C. 119(a)-(d).

BACKGROUND OF THE INVENTION

The invention relates to a covering from mechanically interconnectable elements.

Wall, ceiling, and floor coverings, such as for example prefabricated parquet, real wood floors or laminate floorings, are made of several rows of predominantly rectangular panels. Conventionally, the panels have continuous grooves on a longitudinal side and a head side, and on the respective opposing longitudinal side or head side, respectively, continuous tongues which form fittingly match the grooves. The panels are installed by joining the groove and tongue, wherein the panels of two neighboring rows are arranged offset to each other.

It is known to provide the grooves and tongues with mechanical locking means which, in neighboring panels in a floor covering, form a latching engagement with one another. This is intended to prevent the formation of gaps in the installed floor through stretching or shrinking processes.

The groove and tongue are provided with mutually matching locking elements in the form of indentations, recesses or projections, to retain connected floor panels in the joined position without the use of adhesives. Normally, the panels are turned or clicked into each other along their longitudinal sides and subsequently shifted sideways, such that locking rails on the head sides engage. To facilitate this, slight hammer strikes can be used in connection with a tapping block. This poses the risk of damage to the panels, even when working most carefully.

Solutions also exist in which the abutting head sides do not have to be locked to one another by hammer strikes, but by slidable tongue elements. An example for this is the floor covering described in DE 20 2007 018 662 U1, in which identically configured panels are locked to one another in vertical and horizontal direction by an essentially vertical and horizontal joining motion, wherein the locking in vertical direction can be caused by at least one spring element which is formed in one piece from the core at a side edge, which in the joining motion snaps behind a locking edge which extends essentially in horizontal direction. The at least one tongue element is free relative to the core in the direction of the top side and in the direction of the opposing side edge and in its side edge connected on at least one of the two ends to the core. It is considered disadvantageous that a horizontal force first has to be exerted on the tongue element to urge the tongue element back, before the built up tension of the tongue discharges and the tongue element snaps behind the locking rail. Similar circumstances exist in the floor panel described in EP 1 350 904 A2, in which the tongue which has to be arranged on a face side of a floor covering element, first has to be pushed back, before it can snap into a receptacle provided for the locking. In any case, a sufficiently great space has to be present behind the tongue, so that the tongue can be pushed back before snapping in.

SUMMARY OF THE INVENTION

The invention is based on the object to provide a covering from mechanically interconnectable elements, which can be locked with little and which can be created easily.

The part of the invention which relates to the device is solved with a covering form mechanically interconnectable elements, wherein at least one of the elements is a panel, wherein the elements have a complementary profiling at their opposing sides and are lockable to one another by this profiling, wherein the locking is caused by at least one tongue element, which is hinged to one of the elements, and which is pivotal behind a locking edge of the neighboring element which locking edge extends substantially in horizontal direction, wherein the tongue element is on the one hand connected to a core of the element via an elastic material and on the other hand is a one piece component of the element before the joining motion, characterized in that the one-piece connection between the tongue element and the element is configured as predetermined breaking site, which is intended to fail, in particular to break when the tongue element is pivoted.

The sub claims relate to advantageous refinements of the invention.

The covering according to the invention includes mechanically interconnectable elements, wherein at least one of the elements is a panel. The invention includes the possibility that one of the elements is configured as panel and the further element as frame component for a frame construction for example for double floors. The following description of the invention relates to an embodiment in which the elements which are to be connected are panels.

On their opposing sides the elements have a corresponding profiling, by means of which neighboring elements can be locked to one another in horizontal direction and vertical direction by a substantially vertical or pivoting joining motion. The elements according to the invention allow pivoting down or folding down the element which is to be placed. It is also possible to lock the elements to one another by a substantially or also exclusively vertical motion. The confronting sides which are provided with a corresponding profiling according to the invention are in particular head sides of the elements. The profiling can in principle be provided at all sides i.e. the head sides and the longitudinal sides of the substantially rectangular elements.

In the invention it is provided that the locking can be caused by at least one tongue element, which on one of the elements on one hand is connected to a core of the element via an elastic material and on the other hand is a one-piece part of the element before the joining motion. The elastic material is arranged in a space between a rear side which faces toward the core of the tongue element and the core. In the joining motion, the thus hinged tongue element is pivotal behind a locking rail of the neighboring element which extends substantially in horizontal direction.

By virtue of the fact that the locking rail extends substantially in vertical direction, the two elements are secured against displacement in vertical direction, i.e. perpendicular to the plane of installation. Additional locking rails can be provided on the elements to also cause the lockings of the plane of installation in addition to the locking in vertical direction.

The one-piece connection between the tongue element and the element is configured as predetermined breaking point, which is intended to fail in particular to break when the tongue element is pivoted. When pivoting or lowering the tongue element, a targeted breakage between the tongue element and the core of the element is thus caused by the predetermined breaking point. The failure or the breakage of the predetermined breaking point between the tongue element and the core occurs preferably when connecting two neighboring elements for the first time.

The predetermined breaking point is configured so that when exceeding a defined stress, a failure of the structure occurs exactly at this site to achieve the desired function i.e. the displacement of the tongue element. The failure is in particular a brittle fracture. The failure can however also be a distension of the core material, i.e. a permanent plastic deformation. The breaking mechanic depends on the material properties of the tongue element, wherein the plastic deformation behavior is dependant inter alia on the stress state, the temperature, the type of stress and the load speed. In the following, for reasons of simplicity, the term breaking/break is used for the failure of the predetermined breaking point, namely independent of whether it is a plastic deformation, a partial break or a complete brittle break.

When joining the neighboring elements, the tongue element slides with its bottom side on a support surface of the neighboring element which support surface opposes the locking rail. Here, the tongue element is still a one-piece component of the element, because of a material specific elasticity of the element, which allows a certain pivoting of the tongue element relative to its starting position without the material becoming plastically deformed, i.e. without the material yielding or breaking. When further lowering the element the tongue element is further pivoted relative to its starting position. The tongue element quasi breaks off the core in the region of the predetermined breaking point, however, at the same time remains connected to the core of the element via the elastic material. Optimally, the failure of the predetermined breaking point i.e. in particular the break, occurs as soon as the tongue element snaps into the horizontal position between the support surface and a bottom side of the locking edge or shortly before, i.e. relatively late during joining. When a break occurs before reaching the locking position, the breaking edge on the side of the core functions as abutment, presses on the tongue element side breaking edge and thus causes the tongue element to reach the locking position. The elastic material holds the tongue element in position in such a manner that the breaking edges are substantially opposing one another.

In addition, a predetermined breaking groove can be provided at the predetermined breaking point for targeted initiation of groove stresses and with this for targeted positioning of the breaking point. At the same time, the course of the breaking edge can thus also be influenced at least in part. In addition, the time point Of the break can be determined with the predetermined breaking groove, i.e. how far the tongue element can be pivoted elastically out of its starting position before the break occurs. Further, material which is released during the break can be taken up by the predetermined breaking groove.

If no predetermined breaking groove is provided, a free cut can also be provided in an advantageous embodiment above the predetermined breaking point i.e. toward the top side of the element. This free cut can serve for taking up material which may be generated during the break between the tongue element and the core. The predetermined breaking groove and the free cut above the predetermined breaking point can be cut out of the core simultaneously with the contour of the tongue element, without significantly increasing the production effort.

The support surface with which the tongue element corresponds is substantially oriented horizontally and opposes the locking edge. In an advantageous embodiment a bottom side of the locking edge is parallel to the support surface. The bottom side of the tongue element which slides on the support surface when joining neighboring elements is preferably configured convex. Thereby, the tongue element is in contact with the support surface during the entire joining and is thus guided by the support surface. Advantageously, a top side of the tongue element is configured slanted before the joining motion, i.e. sloping from the predetermined breaking point toward the head side and bottom side of the element. During production of the elements the oblique top side is cut free out of the core after the elastic material was inserted into the rear side space of the tongue element.

After the joining, the tongue element abuts with its top side a bottom side of the locking edge in a substantial horizontal orientation.

Preferably, the elastic material is an adhesive, an elastomer, a reactive adhesive, a hot-melt or a permanently elastic sealing or joint sealer. Reactive adhesive relates to adhesives which cure and set through chemical reactions. These sealing and joint sealers also include acrylates and silicones. The selection of the elastic material of course depends on the materials used for the elements, to achieve a good adhesion between the elastic material and the element. For locking, the tongue element configured according to the invention first does not have to overcome a spring force in the sense that the tongue element is pushed back by the neighboring side of the element. Rather, it is exclusively displaced in the direction of the neighboring element. The tongue element thus does not snap behind the locking edge under the influence of a spring force, but is force guided to be urged behind the locking edge. This has the advantage that no excessive space is required on the rear side of the tongue element which faces the core of the element, because the tongue element is displaced during locking only in one direction and is not pushed in the direction of the free space by the locking edge. The displacement of the tongue element thus only occurs in the direction of the neighboring element.

After the failure, in particular the break of the predetermined breaking point the tongue element is only connected to the core via the elastic material. The elastic connection between the tongue element and the core is configured so that it also remains after the joining. This connection enables a repeated installing of the elements in spite of a break. In addition, the tongue element cannot automatically move back via the restoring forces of the elastic material, because it is held between the support surface and the bottom side of the locking edge. Preferably, the tongue element is in a condition of self-inhibition and is unable to return to its starting position without an outside force, so that the elements are securely held in the locking position, i.e. in the plane of installation. In addition, a profiling which increases friction, can be provided preferably on a bottom side of the locking rail and/or a top side of the tongue element.

Although it is theoretically possible to provide only a single pivotal rail like tongue element, it is considered expedient, when multiple tongue elements which are pivotal independent of one another are arranged on one side of an element. In this case, not only is the vertical placement of the element possible but also the jam free bending or folding of the elements, in which for example in the head side region the head sides first engage with a corner and then finally both head sides extend parallel to one another by further folding down of the element to be placed and completely engage one another.

Because in case of a single long tongue element, an uneven load would result during folding down and with this, tensions within the tongue element, it is expedient to provide multiple tongue elements which are actuated in temporal sequence to one another. The tongue elements can either be arranged adjacent to one another or spaced apart. Advantageously, more than one tongue element is arranged per side.

It is also conceivable, to arrange tongue elements with different elasticities on one side, which allows a stepped snapping-in process. The tongue elements can also be arranged at a distance to one another. For manufacturing it is easiest to first divide a single corresponding tongue element into individual sections. For this, multiple slots can be formed in the original single tongue element so that the individual tongue elements can be actuated one after another during folding down.

It is possible to connect neighboring tongue elements movable relative to one another. As connection means an elastic component for example elastic adhesive as used in the rear space of the tongue element can be used. The elastic connection allows configuring the tongue elements smaller, without the risk that an individual tongue element disconnects from the element in case of damage. Generally, the leeway with regard to construction is greater when the tongue elements are additionally bonded to one another.

In an advantageous refinement, the element which has the locking edge has a locking rail which engages underneath the element which carries the tongue element. This locking rail is configured and intended to secure the neighboring elements against tensile loads in a plane of installation. The additional locking rail exclusively absorbs horizontal tensile forces, i.e. tensile loads in the plane of installation. This ensures that on the top side, no joining gap remains. The entering of fluid and contaminations into possible gaps is prevented.

In particular in wall coverings, the locking rail can serve for being fastened on a support structure in particular a wall side support structure. For example, the locking rail can be fastened to the support structure by a fastening means in the form of a clip. It is also conceivable to directly bolt the locking rail, nail or to adhere, i.e. fix without additional clip.

The inventive idea is also applicable to all floor systems and walls systems, in which a surface is arranged on a carrier which can be in particular a wood composite panel, such as for example an MDF- or particle board, for example real wood coverings, laminate, carriers with lacquered surfaces as surface, linoleum, cork on support panels etc. When the elements are made of HDF- or MDF material, a predetermined breaking point is helpful, however, not absolutely required, because in these materials a clear fiber break occurs. The covering layer can be made in particular of a décor paper with overlay, which determines the esthetic of the elements.

A floor covering can be a parquet floor, a prefabricated parquet floor, a real wood floor or a laminate floor. Also suited are elements made of solid materials such as for example timber floor board, wood elements, cast molding plates from plastic, plastics, form elements or plasterboard.

The inventive idea does not only relate to the joining of elements but as previously mentioned it is also conceivable to configure an element as frame floors or double floors. In such an application, one of the elements to be connected is configured as panel and a second element as frame component. During assembly, the panel is placed in the frame construction which is made of multiple frame components and snapped in with its head and/or longitudinal sides.

BRIEF DESCRIPTION OF THE DRAWING

In the following, the invention is explained in more detail by way of the exemplary embodiments for joining two elements in the form of panels, shown in the schematic drawings. Of course, the shown joints can readily be applied to the joining between a frame component, a frame construction and a panel. It is shown in FIGS. 1 to 3 each a cross section trough the joining region of two neighboring elements in different installation positions, wherein.

DETAILED DESCRIPTION OF PREFERRED EMBODIMENTS

Figure 1:
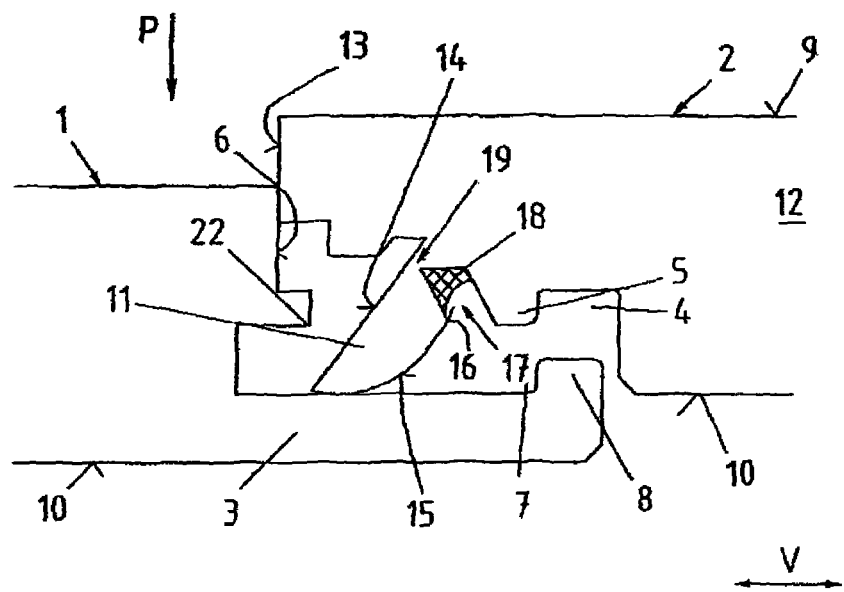
FIG. 1 shows the still unlocked position and FIG. 3 the locked position.

FIG. 1 shows a cross section through two elements 1, 2 in form of panels. This can be a head side cross section of the elements 1, 2. The elements 1, 2 are configured identical, so that the elements 1, 2 can be assembled to a floor covering.

FIG. 1 shows two neighboring elements 1, 2 before their locking. The representation shows a first element 1 in the image plane left and in the image plane right a second element 2, which is intended to be joined with the first element 1. The first element 1 has a locking rail 3 and the second element 2 a one sided coupling bulge 5 which is oriented downwards. The locking rail 3 of the first element 1 projects over a head side 6. The element 2 is arranged relative to the element 1, so that when lowering in the direction of the arrow P the coupling bulge 5 of the second panel engages in a coupling channel 7 of the locking rail 3 and the coupling channel 4 of the second element 2 engages with the coupling bulge 8 of the locking rail 3 of the first element. This region of the elements 1, 2 serves substantially for positioning in a horizontal plane, wherein horizontal in the context of the invention corresponds to the plane of installation V, which coincides with the top sides 9 and bottom sides 10 of the elements 1, 2 which are parallel to one another.

A significant part of the profiling according to the invention is a tongue element 11. The tongue element 11 in this representation is an obliquely downward oriented tongue. Oblique in this case means starting from a joining region of the tongue element 11 and extending with the core 12 of the element 2 to a head side 13 of the second element 2 and a bottom side 10 of the second element 2.

Figure 2:
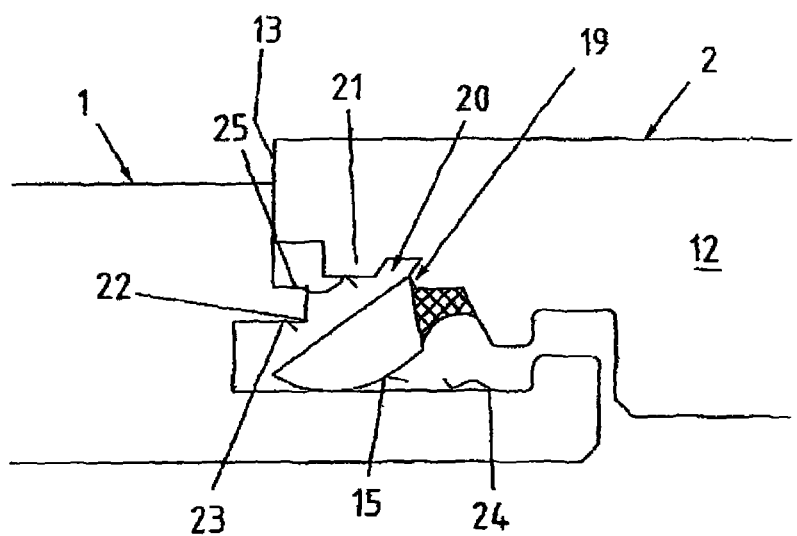

The sloping position or incline relative to the plane of installation V in this embodiment is 53. It is preferably between 40° and 70°, in particular between 50° and 60°. In the exemplary embodiment shown here, a top side 14 of the tongue element 11 is configured as even surface. The bottom side 15 of the tongue element 11 has a convex curvature. Adjoining a rear side 16 of the tongue element 11 which faces toward the core 12 is a space 17 which opens toward the bottom side 10 of the element 2. In this space 17 an elastic material is arranged, which elastically connects the tongue element 11 to the core 12. The tongue element is a one-piece component of the element 2, wherein a transitional region between the core of the element 2 and the tongue element 11 is configured as predetermined breaking point 19. Arranged above the predetermined breaking point 19 is a free cut 20. The free cut 20 is delimited in the direction of the head side 13 of the element 2 by a abutting rail 21 which points towards the bottom side 10 of the element 2 (FIG. 2). The free cut 20 above the predetermined breaking point 19 can be produced in one step with the cutting out of the top side 14 of the tongue element 11. Advantageously, the free cut 20 can take up material released in case of the failure and in particular in case of the break of the predetermined breaking point 19.

On its head side 6, the element 1 has a locking edge 22 which projects over the head side 6 parallel to the plane of installation V. In the exemplary embodiment shown here, a bottom side 23 which adjoins the locking edge 22 extends parallel to a support surface 24 of the locking rail 3.

In the starting position shown in FIG. 1, the elements 1, 2 are oriented with their head sides 6, 13 facing one another. The tongue element 11 rests on the support surface 24 of the locking rail 3 with a first region of its convex bottom side 15. It can be seen that the tongue element 11 can be guided past the protruding locking edge 22 without jamming.

FIG. 2 shows the lowering of the element 2 relative to the element 1 in the direction of the arrow P. Here, the tongue element 11 slides along the support surface with its bottom side and due to the convex curvature remains in contact with the support surface 24.

At the same time, the elastic material 18 in the rear side space 17 of the tongue element 11 is deformed. The tongue element 11 is pivoted in the direction of the neighboring element 1.

Figure 3:
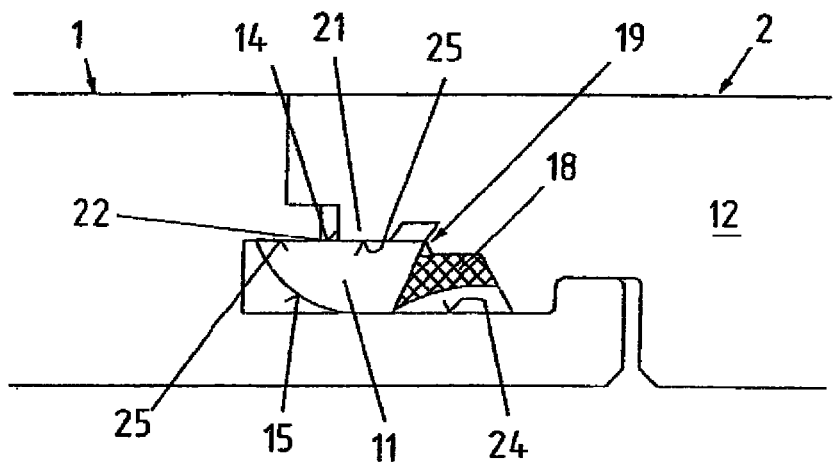

FIG. 3 shows the locked state of the elements 1, 2. Here, the tongue element 11 abuts a bottom side 23 adjacent to the locking edge 22 of the element 1.

The tongue element 11 is disconnected from the core 12 of the element 2 through the break of the predetermined breaking point 19. This is a brittle break. The predetermined breaking point 19 is configured so that the break occurs when transitioning from the position shown in FIG. 2 to the position shown in FIG. 3. In the locking position, the tongue element 11 is only connected to the core 12 of the element 2 via the elastic material 18. The undercut 20 which neighbors the predetermined breaking point 19 serves for taking up fragments which may be released in case of the break between the core 21 and the tongue element 11.

A downward pointing support surface 25 of the abutting rail 21 abuts in the locking position a horizontally oriented top side 14 of the tongue element 11, thereby achieving an additional vertical support of the elements 1, 2. In addition, the coupling bulge 5 in the locking position is arranged almost completely behind the coupling bulge 8 of the locking rail 3, so that a reliable locking in the horizontal plane is ensured.

Figure 4:
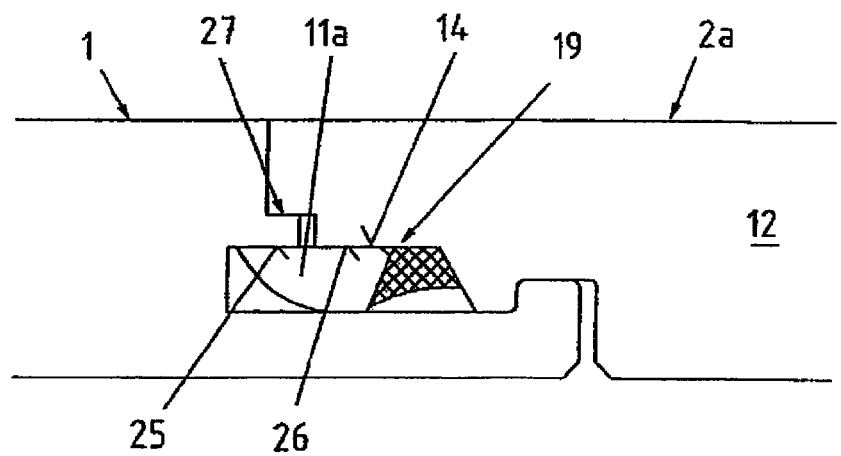
FIG. 4 a cross section through the joining region of two neighboring elements in a further embodiment.

FIG. 4 shows a cross section through a joining region of two neighboring panels 1, 2a in an alternative embodiment of the second element 2a. Here, no free cut is provided above the element 11a and the predetermined breaking point 19, so that in the shown locking position, the tongue element 11a abuts a downward pointing abutting surface 26 which directly adjoins the predetermined breaking point 19, with a greater surface than in the first exemplary embodiment. A further lowering of the second element 2a is not possible because the second element 2a is additionally supported on a console 27 of the first element 1.

Figure 5:
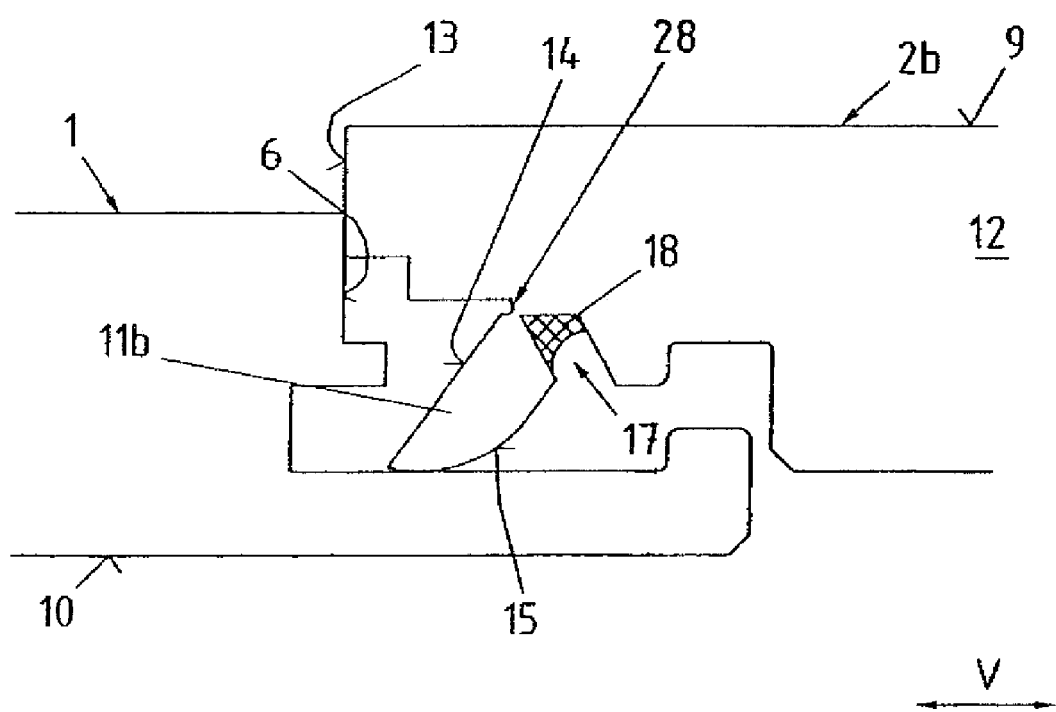
FIG. 5 a cross section through the joining region of two neighboring elements in a further embodiment.

FIG. 5 shows a cross section through a joining region of two neighboring elements 1, 2b before their locking. In this embodiment, a predetermined breaking groove 28 is provided on the top side 14 of the tongue element 11b in the region of the predetermined breaking point 19. This predetermined breaking groove 28 serves the targeted weakening of the structure and leads to a break between the core 12 and the tongue element 11b when joining the elements 1, 2b. In addition, the predetermined breaking groove 28 can take up material which is released during the break.

Figure 6:
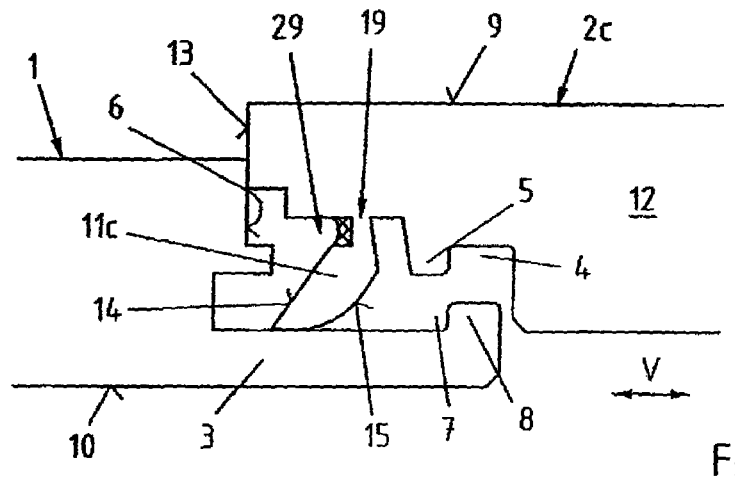
FIGS. 6 to 8 a cross section trough the joining region of two neighboring elements in different installation positions.
Figure 7:
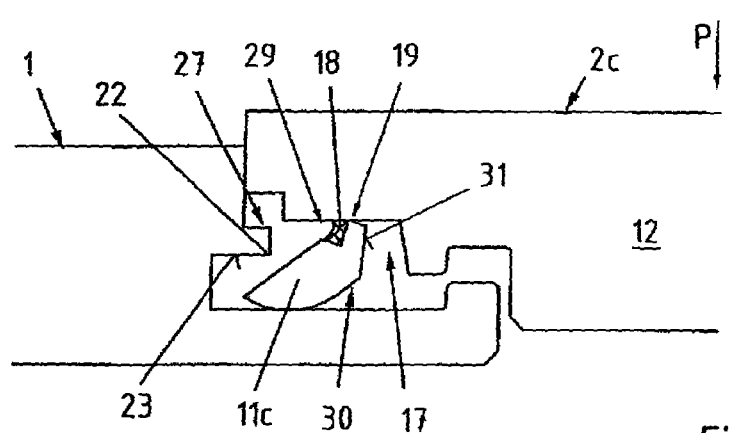
Figure 8:
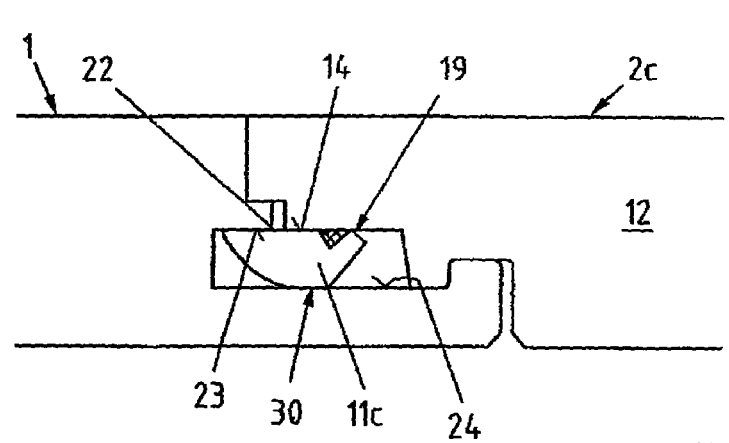

The installation positions of two neighboring elements shown in the FIGS. 6 to 8, as well as the used reference signs correspond essentially to the representations of the FIGS. 1 to 3. However, the tongue element 11c at the core of the element 2c differs from the tongue elements shown in the FIGS. 1 to 5 in that an elastic material 18 is arranged in a groove 29 at the head side 13 of the element 2 and not in a rear side space 17 of the tongue element 11c.

In order to join the neighboring elements 1, 2c, the element 2c is arranged relative to the element 1 so that when lowering in the direction of the arrow P in analogy to FIG. 1, the coupling bulge 5 of the second element 2c engages on a coupling channel 7 of the locking rail 3 and the coupling channel 4 of the second element 2c with the coupling bulge 8 of the locking rail 3 of the first element 1. This essentially also serves for positioning in the horizontal plane of installation V.

The tongue of the tongue element 11c which in analogy to the previous representations is obliquely downward oriented, also extends from a joining region of the tongue element 11c with the core 12 of the element 2c to a head side 13 and a bottom side 10 of the second element 2c. A bottom side 15 of the tongue element 11c also has a convex curvature, which is adjoined by an even region 30. Adjoining this even region 30 is a substantially even rear side 31 of the tongue element 11c. Arranged between the rear side 31 and the core 12 of the element 2c is the space 17. The tongue element 11c is a one-piece component of the element 2c, wherein a transitional region from the core 12 of the element 2c to the tongue element 11c is configured as predetermined breaking point 19.

A free cut which substantially extends parallel to the plane of installation V creates a groove 29 in the joining region between the tongue element 11c and the core 12 of the element 2c, in which an elastic material 18 is arranged. In the shown starting position in FIG. 6 the tongue element 11c rests with a first region of its convex bottom side 15 on the support surface 24 of the locking rail 3 and can be guided past the projecting locking edge 22 without jamming.

FIG. 7 shows the lowering of the element 2c relative to the element 1 in the direction of the arrow P. The tongue element 11c slides with its bottom side 15 along the support surface 24 and due to the convex curvature remains in contact with the support surface 24 during the guiding process, as also shown in FIG. 2. At the same time, the elastic material 18 is compressed or squeezed respectively in the head side groove 29 of the tongue element 11c. The tongue element 11c is pivoted in the direction of the neighboring element 1 and the material is stretched in the region of the predetermined breaking point 19 until the breaking limit and at further lowering past the breaking limit.

FIG. 8 shows the locked state of the elements 1, 2c. Here, the tongue element 11c abuts a bottom side 23 adjacent the locking edge 22 of the element 1 with its top side 14.

Through the breaking of the predetermined breaking point, the tongue element 11c is disconnected from the core 12 of the element 2c. In the locking position, the even region 30 of the bottom side 15 of the tongue element 11c is oriented parallel to a support surface 24 of the element 1. The top side 14 of the tongue element 11c is oriented parallel to the bottom side 23 of the locking edge 22 and abuts the latter. Because of the squeezing of the elastic material 18 in the locking position, the elastic restoring forces act on the core 12 of the element 2c and the tongue element 11c substantially in the direction of the plane of installation V. Thereby, the tongue element 11c is additionally held by the pressure of the restoring forces in its locking position.

The invention claimed is:

1. A covering, comprising:
    plural elements mechanically connectable to one another, with confronting sides of opposite elements having a complementary profiling for allowing the opposite elements to be locked with one another by at least one tongue element hinged to one of the opposite elements for pivoting during a joining motion behind a substantially horizontal locking edge of the other one of the opposite elements, said opposite elements and said tongue element being made of a same first material; and
    an elastic material for connecting the tongue element at least in part with a core of the one of the opposite elements, said elastic material being made of a second material different from the first material,
    wherein the tongue element is formed one-piece with the one of the opposite elements before the joining motion via a predetermined breaking point adapted to fail when the tongue element is pivoted.

2. The covering of claim 1, wherein one of the opposite elements is a panel.

3. The covering of claim 1, wherein a displacement of the tongue element occurs exclusively in a direction of the other one of the opposite elements.

4. The covering of claim 1, wherein before the joining motion, a top side of the tongue element points obliquely downward from the predetermined breaking site toward a bottom side and a head side of the one of the elements.

5. The covering of claim 1, wherein a predetermined breaking groove is provided at a top side of the tongue element in a region of the predetermined breaking site.

6. The covering of claim 1, wherein the one of the opposite elements has a top side, and wherein the tongue element is connected to the one of the opposite elements via the predetermined breaking point only at an end of the tongue element which neighbors the top side.

7. The covering of claim 6, wherein a free cut is arranged between the top side of the one of the opposite elements and the predetermined breaking site.

8. The covering of claim 1, wherein the tongue element has a bottom side, for sliding on a support surface when joining neighboring opposite elements, said support surface opposing the locking edge.

9. The covering of claim 8, wherein said bottom side of the tongue element is configured convex.

10. The covering of claim 8, wherein the bottom side of the tongue element has a region which is oriented parallel to the support surface when two neighboring opposite elements are locked to one another.

11. The covering of claim 1, wherein the tongue element has a substantially even top side which abuts a bottom side of the locking edge in a substantially horizontal orientation.

12. The covering of claim 11, wherein after locking the one of the opposite element to another one of the opposite elements, the top side of the tongue element is oriented parallel to the bottom side of the locking edge and parallel to an abutting surface of the one of the elements.

13. The covering of claim 1, wherein the elastic material is arranged in a space between the core of the one of the opposite elements and a rear side of the tongue element, said rear side facing toward the core, 14. The covering of claim 1, wherein the elastic material is an adhesive or a reactive adhesive.

15. The covering of claim 1, wherein multiple tongue elements which are pivotal independent of one another are arranged on a side of the one of the opposite elements.

16. The covering of claim 1, wherein neighboring tongue elements are connected to one another by an elastic component for movement relative to one another.

17. The covering of claim 1, wherein the the one of the opposite elements has a locking rail which engages underneath another one of the opposite elements, said locking rail being configured for securing neighboring opposite elements against tensile loads in a plane of installation.

18. The covering of claim 1, wherein at least one of the opposite elements is configured as a frame component for a frame structure.

* * * * *